United States Patent [19]

Martin

[11] 4,164,879
[45] Aug. 21, 1979

[54] MACHINE TOOL COOLANT SYSTEM

[75] Inventor: Kenneth R. Martin, Cincinnati, Ohio

[73] Assignee: The Warner & Swasey Company, Cleveland, Ohio

[21] Appl. No.: 860,594

[22] Filed: Dec. 14, 1977

[51] Int. Cl.² .................... B23B 3/20; B23B 29/32; B23B 25/00

[52] U.S. Cl. .................... 82/2 R; 82/36 R; 82/36 A; 407/11; 408/56; 408/59; 408/35; 29/568; 409/136

[58] Field of Search ............. 408/239 A, 239 R, 56, 408/57, 59–61, 35; 90/11 D; 82/36 A, 2 R, 36 R; 407/11; 29/568

[56] References Cited

U.S. PATENT DOCUMENTS

| | | | |
|---|---|---|---|
| 487,847 | 12/1892 | LeVesconte | 408/60 |
| 1,359,955 | 11/1920 | Bernay | 408/57 |
| 3,242,819 | 3/1966 | Erikson | 90/11 D |
| 3,375,742 | 4/1968 | Sturm | 82/36 A |
| 3,798,726 | 3/1974 | Dudley | 407/11 |
| 3,893,355 | 7/1975 | Maastricht | 82/24 R |

*Primary Examiner*—Leonidas Vlachos

[57] ABSTRACT

A coolant system for a machine tool is disclosed. Sockets on the machine tool are equipped with check valves biased to a closed position. When a tool is inserted into a socket, an actuating member opens the check valve to enable coolant to flow through a conduit in the tool to the cutting edge of the tool. Tools whose cutting edges do not require coolant are not equipped with the actuating member. In addition, a distributor is provided for use in the coolant system of a machine tool having a turret. The distributor is mounted on the turret and is coaxial with the axis of rotation of the turret. Coolant is piped into the center of a distributing member having an outlet on a cylindrical side surface. A receiving member has a cylindrical chamber in which the distributing member is rotatably disposed. The receiving member has a plurality of radially disposed passages which lead from the receiving member to the tool receiving sockets on the turret. Coolant flows only to a tool in the working position because only the passage leading to that tool is aligned with the outlet of the distributing member. As the turret is rotated to index a different tool to the working position, coolant is ported to the passage leading to the tool then in the working position.

22 Claims, 6 Drawing Figures

MACHINE TOOL COOLANT SYSTEM

BACKGROUND OF THE INVENTION

The present invention relates generally to machine tools and more particularly to a coolant system for supplying cooling fluids to a cutting tool during machining operations.

In the past attempts have been made to supply coolant to the cutting edge of a tool during machining operations. Some known cooling systems are disclosed in U.S. Pat. Nos. 3,893,355; 1,359,955 and 487,847. While the past attempts have been more or less successful in supplying coolant, it is believed that the present invention represents a substantial improvement.

Prior systems have been devised which accommodate a machine tool having an automatic tool changer. But prior systems have not provided a simple method for preventing a flow of coolant when a tool is absent during a tool changing operation. Further prior systems have not provided an automatic coolant cut off to a tool which does not require coolant. In addition, when using a coolant system on a machine tool having a rotatable turret with a plurality of tools, each able to be indexed to a working position, a mechanism must be provided which supplies coolant only to the cutting tool in the working position.

SUMMARY OF THE INVENTION

The present invention provides a new and improved coolant system for a machine tool having a rotatable turret. A distributor ports coolant only to the turret socket indexed to the working position. A non-rotatable distributing member has a single coolant outlets. A manifold is fixedly connected and coaxial with the turret of the machine tool. It includes a separate passage associated with each tool holding socket for conducting coolant from a receiving surface to the associated socket. The receiving ends of these passages are in alignment with the coolant outlet only when the associated socket has been indexed to the working position.

In addition, the present invention provides a check valve assembly in each socket and an actuator member on selected tools. The check valve permits coolant to flow only when a tool is in the socket and then only when the tool is equipped with an actuator member. The check valve assembly includes a circular valve seat and a spherical valve member. A biasing spring urges the valve member toward a closed position abutting the valve seat. If the tool is one which requires coolant, it is equipped with an actuator pipe which will project upward through the valve seat to lift the valve member off the valve seat when the tool is inserted in the socket. Coolant may then flow around the valve member and through the pipe toward the cutting edge of the tool. Tools not requiring coolant are not equipped with an actuator pipe.

Accordingly, it is an object of the present inention to provide a new and improved flood coolant system for a machine tool wherein the tool-receiving socket of the machine tool is provided with a check valve biased to a closed position to prevent coolant flow and the tools adapted to be received in the socket of the machine tool are provided with actuators for opening the check valve to enable coolant to flow to the cutting edge of the machine tool.

It is a further object of this invention to provide a coolant system for use with a plurality of tools, any one of which may be indexed to the working position, and wherein the system includes a distributor for directing coolant only to the tool indexed to the working position.

BRIEF DESCRIPTION OF THE DRAWINGS

These and other objects and features of the invention will become apparent upon reading the following description with reference to the drawings in which.

DESCRIPTION OF A SPECIFIC PREFERRED EMBODIMENT OF THE INVENTION

Figure 1:
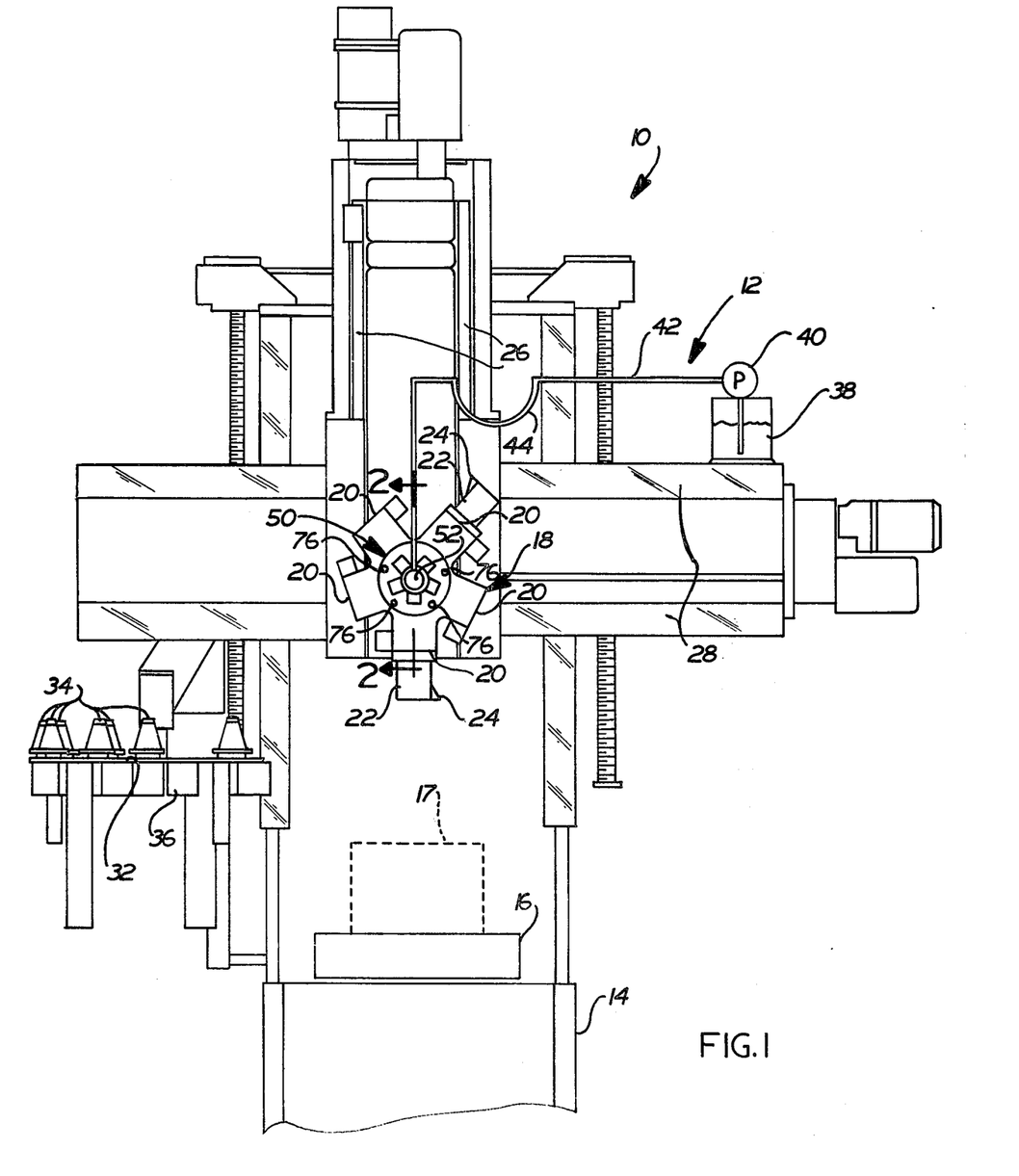
FIG. 1 is a front elevational view of a machine tool equipped with the coolant system of the present invention.

A machine tool 10 having a flood coolant system 12 constructed in accordance with the present invention includes a base 14 which supports a rotating table 16 (FIG. 1). The workpiece 17 (shown in phantom) is mounted to the table 16.

The machine tool 10 also includes a rotatable turret 18. The turret 18 includes a plurality of conical sockets 20 adapted to receive cutting tools 22. The turret 18 is rotatable to index each tool holding socket 20 to a working position in which the socket faces downwardly toward the workpiece 17. When the tool 22 in the socket 20 which has been indexed to the working position is brought into contact with the rotating workpiece, the cutting edge 24 of the tool 22 cuts away portions of the rotating workpiece. The turret 18 is movable horizontally and vertically with respect to the workpiece on guide rails 26 and 28.

The machine tool 10 (FIG. 1) also includes means for automatically changing the cutting tool 22. A carousel 32 supporting a plurality of tools 34 is disposed to the side of the rotating table 16. When a tool 22 is to be changed, the turret 18 is moved into a position directly above the carousel 32. The carousel 32 is rotated until an empty tool gripper 36 on the carousel is disposed beneath the tool 22 in the turret 18. Then the turret 18 is lowered onto the tool gripper 36 and the tool is disengaged from the socket 20. The turret 18 is next raised, and the carousel 32 is rotated until a desired tool 34 is located beneath the turret. The turret 18 is then lowered onto the desired tool 34 which is engaged by the socket 20. The turret 18 may then be moved back to a position in which the cutting edge 24 of the tool 22 is disposed in contact with the rotating workpiece.

A machine tool 10 constructed in accordance with the present invention also includes a flood coolant system 12. The system includes a refillable reservoir 38 (FIG. 1) which provides a source of coolant. The reservoir 38 is mounted on the machine tool 10 in any convenient location. A pump 40 is connected with the reservoir and supplies coolant under pressure. A conduit 42 leads from the pump 40 to the turret 18 and includes a flexible portion 44 in order to accommodate the horizontal and vertical motion of the turret. A distributing system 50 on the turret 18 directs the coolant to the cutting edge 24 of the tool 22 which has been indexed to the working position.

Figure 2:
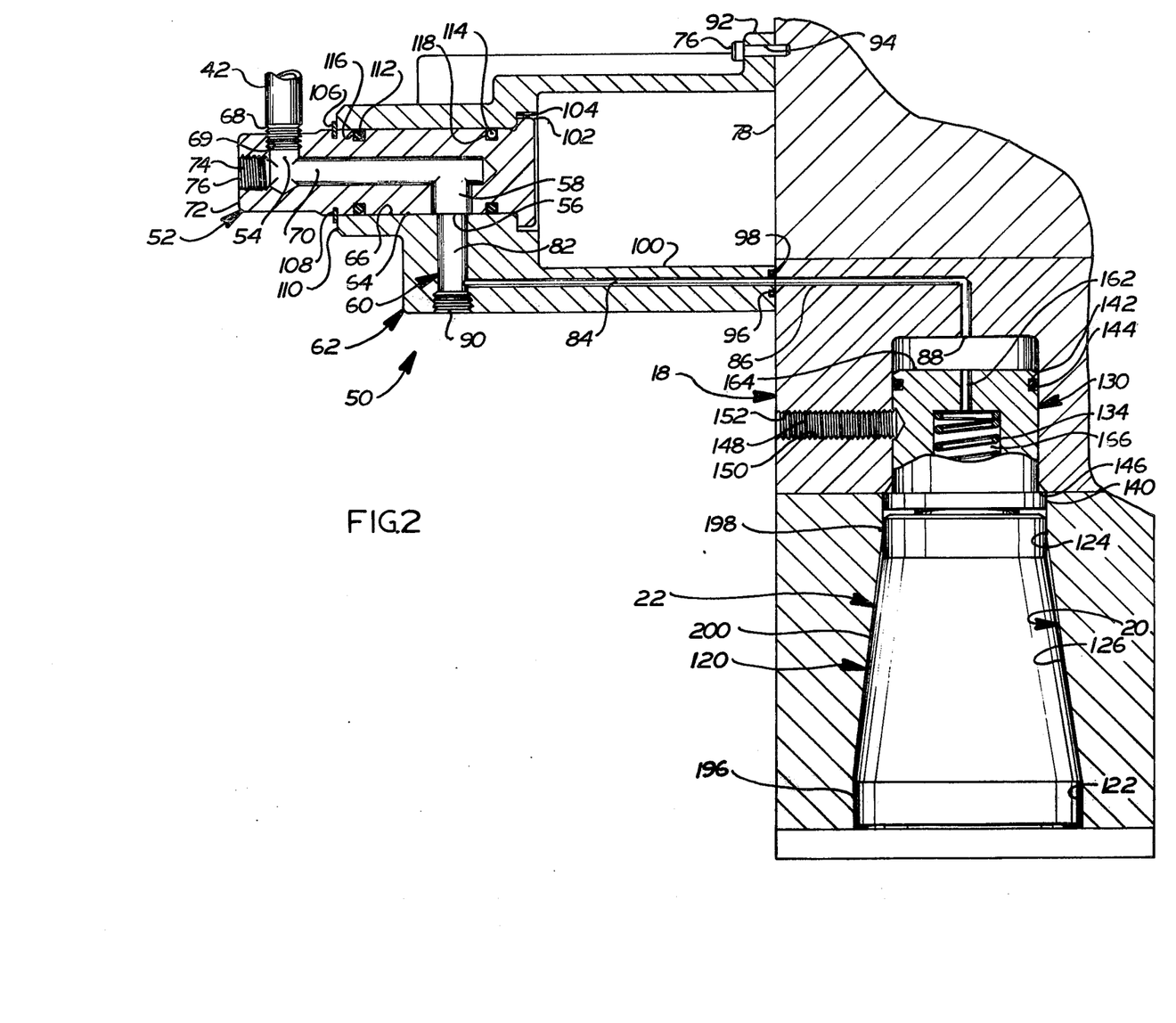
FIG. 2 is an enlarged sectional view taken along line 2—2 of FIG. 1 showing a coolant distributor constructed in accordance with the present invention.
Figure 3:
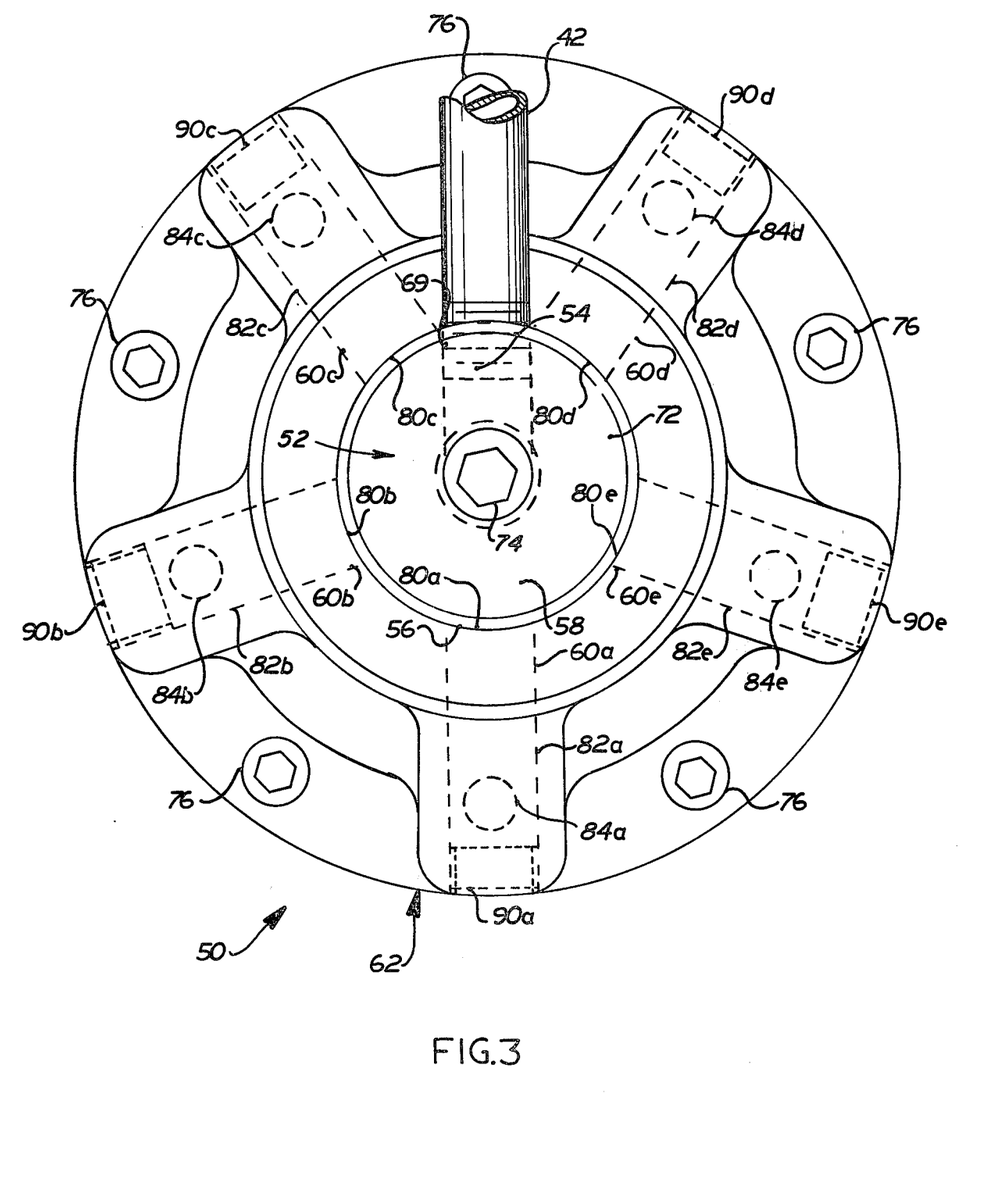
FIG. 3 is an enlarged front elevational view of the distributor of FIG. 2.

In operation, the coolant flows from the reservoir 38 through the conduit 42 under pressure supplied by the pump 40 to a nonrotatable distributing member 52 (see FIGS. 1, 2 and 3). The coolant enters the distributing member 52 at a first radial passage 54 (FIG. 2) and leaves via an outlet 56 at the end of a second radial passage 58. The coolant then enters one of five radial passages 60a, 60b, 60c, 60d, 60e (FIG. 3) in the manifold 62 and is directed to an associated tool socket 20.

When the turret 18 rotates to change which tool 22 is in the working position, the manifold 62 rotates with the turret relative to the distributing member 52. This results in a blocking of coolant flow to the tool socket 20 which was previously in the working position and a porting of coolant to the tool socket which moves into the working position. Thus, the radial manifold passage 60a (FIG. 3) which was aligned with the radial passage 58 in the distributing member 52, is no longer aligned with the outlet of the distributing member 52. Instead, a different radial passage 60b, c, d, or e in the manifold 62 is brought into alignment with the outlet 58 of the distributing member 52. The outlet 56 of the distributing member 52 is aligned with the turret 18 and the machine tool base 14 so that coolant is fed to only the turret socket 20 which is in the working position.

The distributing member 52 (FIG. 2) is fixedly connected with a rigid end portion of the conduit 42 which leads from the pump 10. The distributing member 52 is generally cylindrical and is disposed in a coaxial relationship with the axis of rotation of the turret 18. However, the distributing member 52 does not rotate with the turret 18. The distributing member 52 includes a cylindrical distributing surface 64 (FIG. 2) disposed in sliding abutting engagement with a similarly shaped receiving surface 66 on the manifold 62.

The conduit 42 from the pump 40 includes a threaded end portion 68 which is screwed into similar threads 69 in the first radial passage 54 in the distributing members 52 (FIG. 2). The radial passage 54 extends from the outside surface of the distributing member 52 to its center where it joins a cylindrical axial passage 70 which extends from a circular end 72.

A plug 74 fills the opening at the circular end 72 of the distributing member 52 formed by the axial passage 70; this plug 74 prevents leakage of coolant.

The axial passage 70 connects with the radial passage 58 which extends from the axial passage 70 to the surface 64 of the distributing member 62 where it forms an opening on the distributing surface 64. The second radial passage 58 meets the surface 64 of the distributing member 62 at a location diametrically opposed and axially displaced from the first radial passage 54. Together the radial passages 54 and 58 and the axial passage 70 through the distributing member form a path through which the pressurized coolant flows.

When coolant leaves the distributing member 52 it enters one of five passages 60a, 60b, 60c, 60d, and 60e in the manifold 62 (FIG. 3). The manifold 62 is connected with the turret 18 and rotates with it. In the present instance, five bolts 76 hold the manifold securely to the face 78 of the turret 18.

The manifold 62 includes a receiving surface 66 which is generally cylindrical and coaxial with the axis of rotation of the turret 18. The receiving surface 66 has five openings 80a, 80b, 80c, 80d, and 80e (FIG. 3) each forming one end of a passage 60a, 60b, 60c, 60d and 60e leading to one tool socket 20. Each passage 60 to a socket 20 has a first portion 82 extending radially outward from and perpendicular to the receiving surface 66 (FIGS. 2 and 3). Each such radially extending first portion 82 is axially aligned with the outlet 56 of the distributing member 52. However, only one such radially extending passage 82 can be aligned with the outlet 56 of the distributing member 52 to enable coolant to flow into that passage. Thus relative rotation of the distributing members 52 and the manifold 62 brings each opening 80a, 80b, 80c, 80d and 80e in the manifold 52 successively into alignment with the distributing member outlet 56. Thus coolant is directed to only one receiving passage 82 in the manifold 62 at a time.

Each radial receiving passage 82 in the manifold 62 is connected with an associated passage 84a, 84b, 84c, 84d and 84e (FIGS. 2 and 3) which leads to the turret 18. The passages 84 are perpendicular to the receiving passages 82. Each of the passages 84 communicate with passages 86 in the turret 18. Each turret passage 86 leads to an outlet 88 coaxial with the axis of an associate one of the sockets 20 (FIG. 2). Thus, each turret socket 20 is connected in fluid communication with the distributing member 52 by passages 82, 84, and 86. However, the distributing member is effective to port coolant to only the passages 82, 84, and 86 leading to the tool socket 20 which is in the working position, that is pointed downwardly toward the workpiece 17.

A plug 90 (FIG. 2) is supplied to close the end of the radial passage 82 which is opposite the opening in the receiving surface 62. This provides a coolant-tight seal.

The manifold 62 is generally cylindrical (FIGS. 2 and 3). A circumferential flange extending from one end surface 92 has holes 94 to accommodate bolts 76 used to connect the manifold 62 to the turret face 18. An annular recess surrounding the interface of each passage 84 from the manifold 62 to the turret 18 has an O-ring 98 (FIG. 2) to form a coolant-tight seal between the manifold and the turret.

A hollow cylindrical center section 100 of the manifold 62 is coaxial with the outside of the manifold and of larger diameter than the receiving surface 66 of the manifold. The cylindrical distributing member 52 is inserted through the hollow portion 100 of the manifold 62. The cylindrical distributing surface 64 of the distributing member 52 is moved into telescopic engagement with the receiving surface 66 of the manifold 62. Axial motion in one direction of the distributing member 52 with respect to the manifold 62 is prevented by abutting engagement of a circumferential flange 102 with an annular stop surface 104 in the manifold. Axial motion of the distributing member 52 in the other direction is prevented by a circular snap ring 106 which is engaged in a groove 108 and abuts stop surface 110 on the manifold opposite the stop surface 104. O-rings 112 and 114 are provided in circumferential grooves 116 and 118 to provide a coolant-tight seal between the distributing member 52 and the manifold 62.

Figure 4:
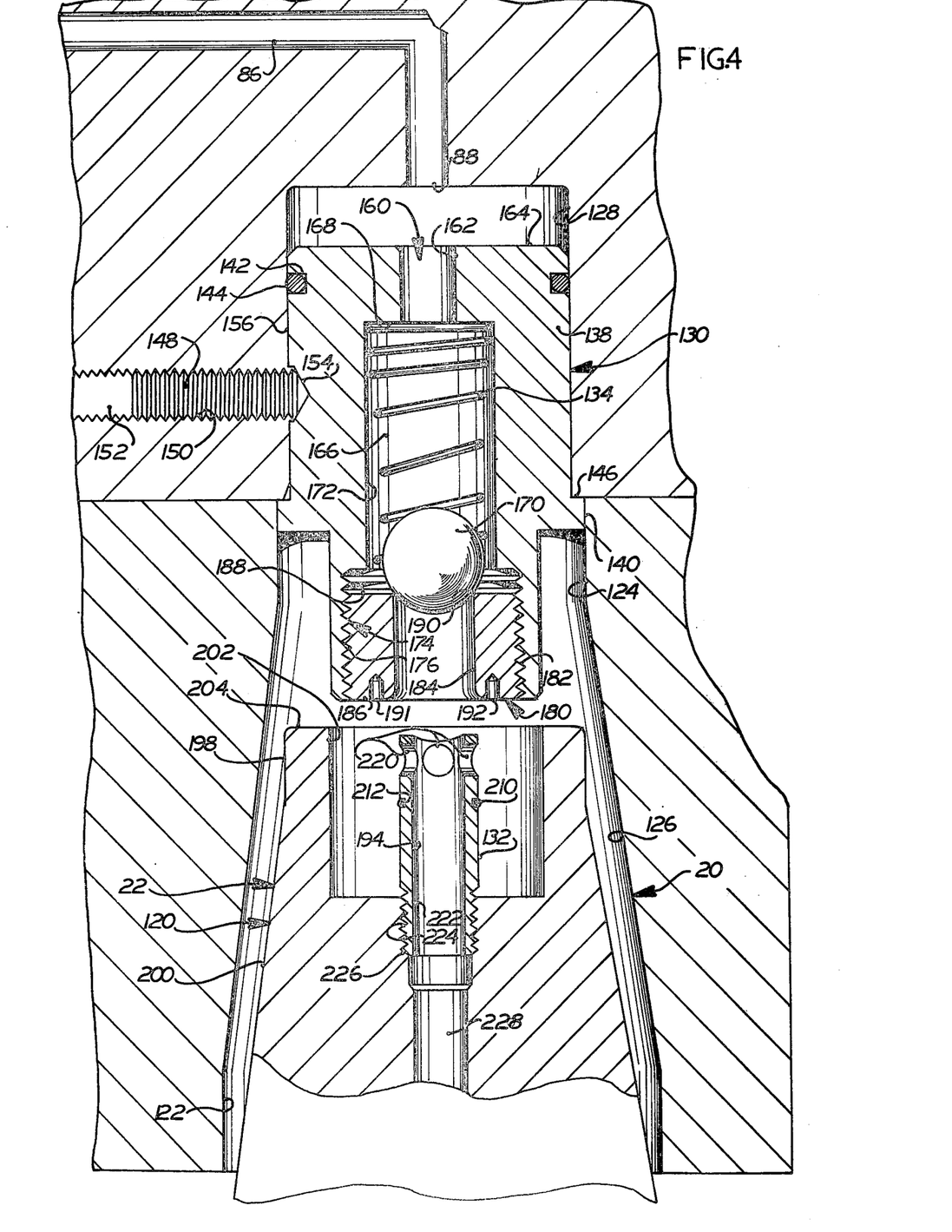
FIG. 4 is an enlarged sectional view of a tool-receiving socket on the machine tool of FIG. 1 and showing a tool before it is fully seated in the socket and a coolant flow control valve in the socket in a closed condition.
Figure 5:
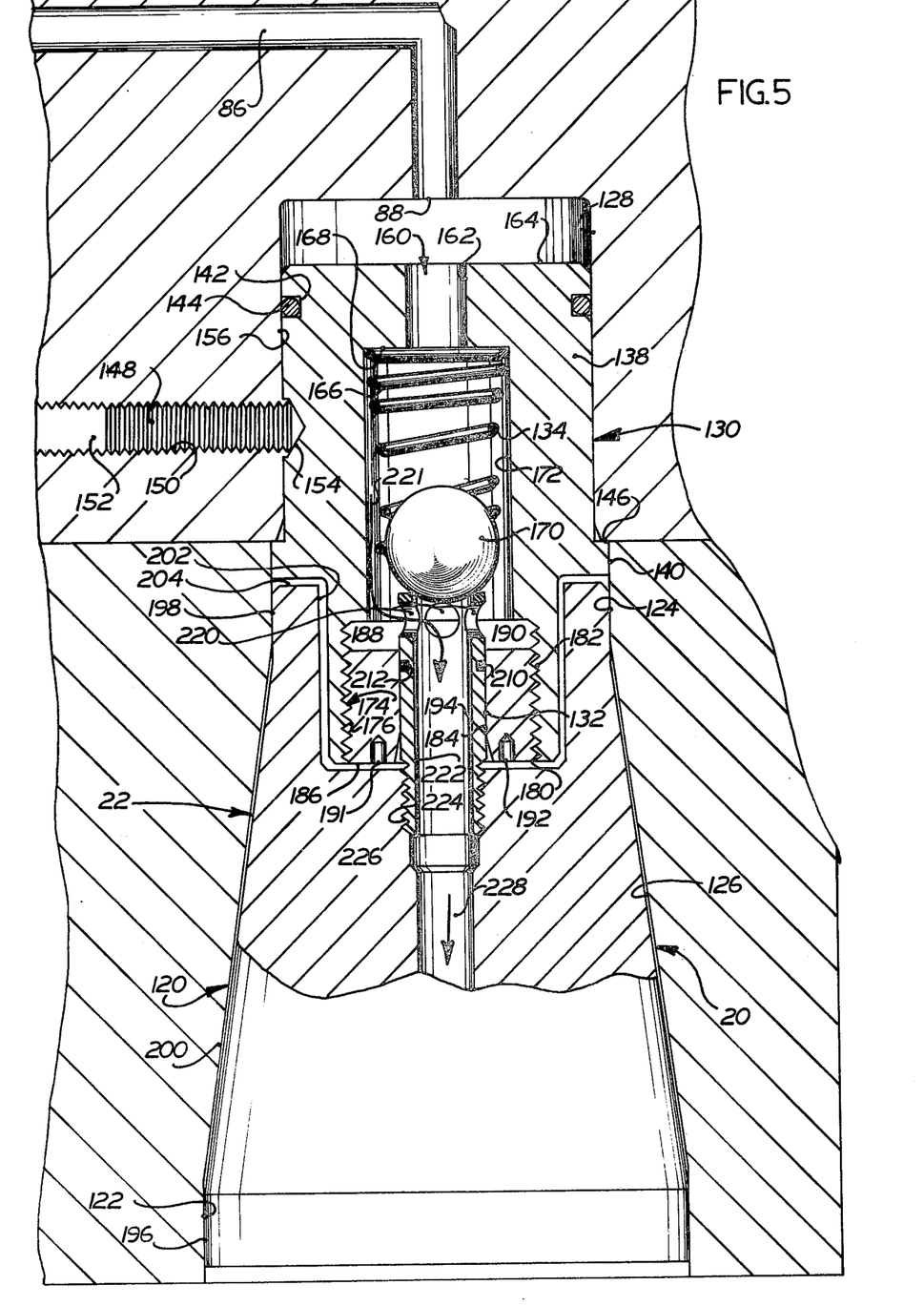
FIG. 5 is a view similar to FIG. 4, but showing a tool fully seated in the socket and the coolant flow control valve of FIG. 4 in an open condition.
Figure 6:
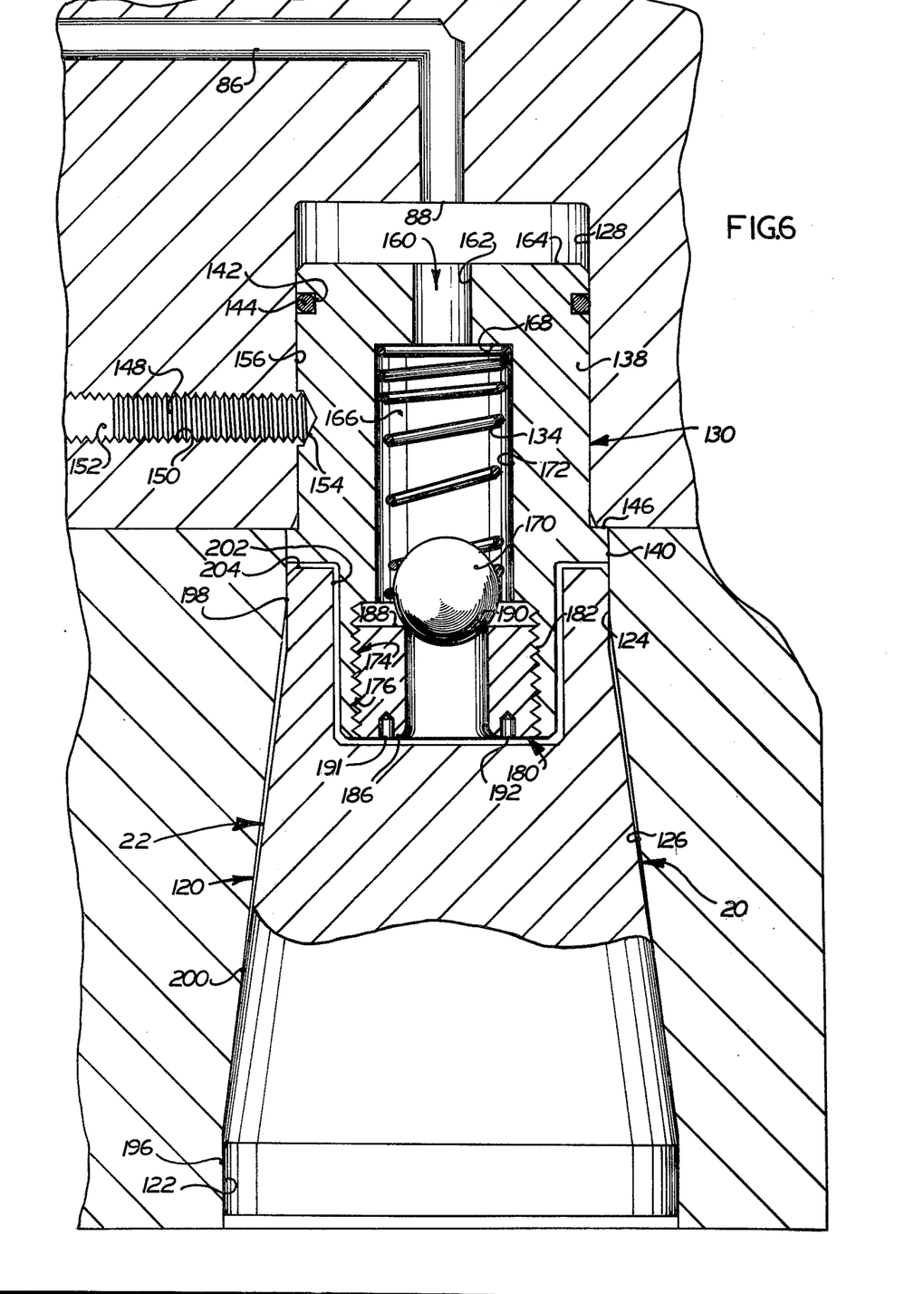
FIG. 6 is a view similar to FIG. 5 but showing another tool fully seated in the socket and the coolant flow control valve in the closed condition.

Each socket 20 is adapted to receive a tapered end portion 120 of a tool 22 (FIGS. 4–6). The socket 20 has a first lower cylindrical portion 122 (as viewed in FIGS.

4, 5, and 6) and an upper second cylindrical portion 124 having a smaller diameter than the first cylindrical portion. The first and second cylindrical portions 122 and 124 are connected by a conical section 126. The tapering conical section 126 is provided to guide the tool 22 into the socket 20 while the cylindrical sections 122 and 124 serve to provide firm surfaces to align the tool 22 once it is fully seated.

In addition to and coaxial with the tapered and cylindrical sections 122, 124 and 126, the socket 20 has a cylindrical portion 128. The cylindrical portion 128 has a smaller diameter than the cylindrical portion 124. The uppermost cylindrical portion 128 is provided to hold a check valve assembly 130.

Each socket 20 includes a check valve assembly 130 which controls the flow of coolant to the socket. The check valve assembly 130 is operable between a closed condition (FIG. 4) blocking coolant flow and an open condition (FIG. 5) enabling coolant to flow. The check valve assembly 130 is operated from the closed condition to tht open condition under the influence of an operating member or standpipe 132 associated with a tool 22. The check valve assembly 130 is biased to a closed position by a coil spring 134. Since the check valve assembly is biased closed it blocks coolant flow when no tool is in the socket 20, such as during the tool changing operation. The check valve assembly 130 also prevents the coolant flow when the tool 22 in the socket 20 has no operating member (FIG. 6).

The check valve assembly 130 is housed in a cylindrical member 138 having a circumferential, radially extending shoulder 140 to limit upward motion (as viewed in FIGS. 4, 5 and 6) relative to the turret 18. The housing 138 has a circumferential groove 142 to hold an O-ring 144 used to make a tight seal.

When the check valve housing 138 has been inserted in the socket 20 and the shoulder 140 is in abutting engagement with the stop surface 146 on the turret, a set screw 148 is tightened to hold the check valve assembly 130 in place. The set screw 148 cooperates with threads 150 in a passage 152 which extends perpendicular to the axis of the socket 20. The set screw 148 engages a blind hole 154 in the cylindrical outside surface 156 of the check valve housing 138.

A central passage 160 extends axially through the check valve housing 138. A first part 162 of this passage, the uppermost part, has the smallest diameter of the entire passage 160 and connects at one end with a circular end surface 164 of the housing 138. This first part 162 provides a passage through which the coolant may flow.

The second part 166, the central portion, of the passage 160 has a larger diameter than the first part. An annular surface 168 connects the uppermost and center portions of the passage 160 and makes a base against which a biasing spring 134 acts. The center cylindrical portion of the central passage 166 through the check valve housing 138 contains the biasing surface 134 and a spherical valve member 170. The central portion 166 of the passage through the check valve housing 138 has a larger diameter than the spherical valve member 170. The third portion 174 of the passage through the check valve housing 160 has a larger diameter than the second portion 166 and includes a threaded inside surface 176. This third part 174 is adapted to receive a valve seat member 180 which has cooperating threads 182.

The valve seat member 180 is cylindrical and includes a central cylindrical passage 184 which connects the two circular end surfaces 186 and 188. The upper end of this passage 184 provides a circular valve seat 190 to engage the valve member 170 when the valve assembly 130 is closed (FIG. 4). When the valve assembly 130 is in an open condition (FIG. 2), coolant flows through the passage 184 in the valve seat member 180 and into the tool 22. The valve seat member 180 is provided with a pair of blind holes 190 and 192 to engage the pins (not shown) of a wrench (not shown) to facilitate installation of the valve assembly 130.

It is not necessary to provide coolant to every tool 22 which is used in a machine tool 10 built in accordance with the present invention. With some tools coolant is required, while with other tools no coolant is required. The tools 22 which require coolant are provided with an actuator member 132 to unseat the valve member 170 as the tool is inserted into the socket 20 (FIGS. 4 and 5). Each of these tools have a central passage 194 to conduct coolant to the cutting edge 24 (cutting edge 24 shown in FIG. 1 only).

The end portion of a tool 120 adapted to be received in the socket of the turret 18 has two cylindrical surfaces 186 and 198 connected by a tapering surface 200. The cylindrical surfaces 196 and 198 cooperate with corresponding surfaces 122 and 124 in the socket 20 and serve to hold the tool in a position coaxial with the socket 20. Coaxial with the tool end portion 120 is a cylindrical recess 202 extending down from an upper end surface 204. This recess 202 receives the cylindrical portion 206 of the check valve housing 138 which extends downward below the flange 140 of the housing.

A standpipe or valve actuator 132 extends up from the circular bottom 208 of the recess 202 in the tool 22. The pipe 132 is coaxial with the recess 202 and serves as an actuator to unseat the valve member 170 as the tool is inserted into the socket 20. As the tool 22 is inserted into the socket 20, the pipe 132 is inserted into the passage 184. An O-ring 210 seated in an annular groove 212 around the perimeter of the pipe 132 provides a coolant-tight seal between the valve seat member 180 and the pipe. When the tool 22 is fully seated in socket 20, the pipe 132 extends up through the valve seat 190 and holds the valve member 170 off the seat 190 against the influence of the biasing spring 134.

Radial passages 220 connect the outside of the pipe 132 with the cylindrical passage 194 inside of the pipe Coolant can then flow from the central passage 160 in the check valve housing 138 around the outside of the valve member 170 and into the inside of the pipe 132 along a path indicated by the arrow 22 (FIG. 5). The end portion 222 (FIG. 5) of the pipe 132 opposite the radial passages 220 the pipe has threads 224 which engage a threaded end portion 226 of a passage 228 through the tool 22. The passage 228 extends through the center of the tool 22 to the cutting edge 24.

Thus when a tool 22 is inserted into the socket 20 the valve member 170 is lifted from the valve seat 190 to enable coolant to flow to the cutting edge 24 of the tool. However, if the tool 22 is not provided with a pipe 132 to lift the valve member 170 off the valve seat 190, the coolant will not flow to the tool (FIG. 6). Additionally, the coolant will flow only to the socket 20 which is indexed to the working position. The distributing member 62 provides that the coolant will be directed only to one socket 20 at a time, and this socket is the one which is in the working position.

Although the check valve assembly 130 and actuating member 132 have been described with reference to a machine tool 10 having a rotatable turret 18, it is to be understood that the check valve 132 assembly may be used with a machine tool having a single socket and no turret. It should also be noted that the check valve assembly 130 not only shuts off coolant flow when the tool 22 which is inserted into the socket 20 is not equipped with an actuator member 132, it also prevents the loss of coolant during the changing of tools. If the check valve assembly 130 were not present, when a tool 22 is being changed, the coolant would flow freely out of the turret 18 and onto the carousel 32. In order to prevent this, a valve would be required to eliminate the flow of coolant or the pump would have to be turned off. The check valve assembly 130 of the present invention eliminates the necessity of these devices.

Thus it is clear that the present invention provides a new and improved coolant system 12 having a distributor 50 which ports coolant only to the socket 20 indexed to the working position. A non-rotatable distributing member 52 has a single coolant outlet 56 disposed on a cylindrical surface 64. A manifold 62 is fixedly connected to and coaxial with the turret 18 of the machine tool 10. It includes a separate passage 60 associated with each socket 20 for conducting coolant from a receiving surface 66 on the manifold 52 to the associated socket. The receiving ends 80 of these passages 60 are in alignment with the coolant outlet 56 only when the associated socket 20 has been indexed to the working position.

In addition, the present invention provides a check valve assembly 130 in each socket 20 and an actuator member 132 on selected tools. This enables coolant to flow only when a tool 22 is in the socket 20 and then only when the tool is equipped with an actuator member 132. The check valve assembly 132 includes a circular valve seat 190 and a spherical valve member 170. A biasing spring 134 urges the valve member 170 toward a closed position abutting the valve seat 190. If the tool 22 is one which requires coolant, it is equipped with a pipe 132 which will project upwardly through the valve seat 190 to lift the valve member 170 off the valve seat when the tool is inserted in the socket 22. Tools not requiring coolant are not equipped with a pipe (FIG. 6). Therefore the check valve assembly is not opened when one of these tools is inserted into a socket 22.

What is claimed is:

1. A machine tool assembly comprising a tool having a cutting edge, at least one socket adapted to releasably receive said tool, a source of pressurized coolant, a conduit adapted to conduct coolant from said source to said socket, passage means connected with said tool for conducting coolant from said socket to the cutting edge of said tool, valve means for controlling coolant flow from said conduit to said passage means, said valve means being operable between a closed condition blocking coolant flow and an open condition enabling coolant to flow through said passage means, said valve means including a valve body having a valve seat, a valve member adapted to sealingly engage said valve seat, and biasing means for urging said valve means toward the closed condition, said biasing means including spring means for urging said valve member into engagement with said valve seat, and actuator means connected with said cutting tool for operating said valve means from the closed condition to the open condition as said cutting tool is received in said socket.

2. A machine tool assembly as set forth in claim 1 wherein said valve member is spherical and wherein said valve body includes surface means for defining a cylindrical passage through said valve body, said surface means having an axis extending through the center of said valve member, said actuator means including a tubular member having an interior and an exterior, said interior being connected with said passage means and said exterior being connected with said conduit, said tubular member having a circular end portion adapted to engage said spherical valve member and to lift it off said valve seat as said tool is received in said socket, said tubular member having surface means for enabling coolant to flow from said exterior of said tubular member to said interior of said tubular member by defining a passage intermediate opposite ends of said tubular member and interconnecting said exterior and said interior of said tubular member.

3. A machine tool comprising a base, a rotatable turret connected with said base, said turret having a plurality of recesses each of which is adapted to receive a portion of a tool having a cutting edge, said turret being rotatable to selectably index each tool assembly receiving recess to a working position, a source of pressurized coolant, a plurality of conduits on the turret, each of said conduits being associated with one of the tool receiving recesses on said turret and being adapted to direct a flow of coolant toward the cutting edge of a tool disposed in the associated recess, distributing means for directing a flow of coolant from said source to the conduit associated with a tool receiving recess disposed in a working position, said distributing means including surface means for porting coolant to the one conduit associated with the tool receiving recess in the working position and blocking the flow of coolant to the other conduits, valve means associated with each of said conduits for controlling coolant flow through each of said conduits toward the cutting edge of a tool received in the recess of the associated conduit, said valve means being operable between a closed condition preventing coolant flow and an open condition enabling coolant to flow, said valve means including biasing means for urging said valve means to said closed position, and actuator means associated with at least one of the tools for operating said valve means from said closed position to said open position when the tool is received in a recess in the turret.

4. A machine tool assembly as set forth in claim 3 wherein said surface means for porting coolant includes a non-rotatable distributing surface and rotatable receiving surface disposed in sliding abutting engagement with said distributing surface, said distributing surface defining an outlet connected with said source, said receiving surface defining a plurality of inlets each of which is connected with one of said conduits, said receiving surface being rotatable with said turret to enable coolant to flow from said outlet through a selected one of said inlets and a conduit toward the cutting edge of a tool disposed in the tool receiving recess indexed to the working position.

5. A machine tool assembly comprising a tool having a cutting edge, at least one socket adapted to releasably receive said tool, a source of pressurized coolant, a conduit adapted to conduct coolant from said source to said socket, passage means connected with said tool for conducting a flow of coolant from said socket to the cutting edge of said tool, valve means for controlling coolant flow from said conduit to said passage means, said valve means being operable between a closed condition blocking coolant flow and an open condition enabling coolant to flow through said passage means, said valve means including biasing means for urging said valve means toward the closed condition, actuator means connected with said cutting tool for operating said valve means from the closed condition to the open condition as said cutting tool is received in said socket.

6. A machine tool assembly as set forth in claim 5 further including a second tool having a cutting edge, said second tool being ineffective to operate said valve means from the closed condition to the open condition.

7. A machine tool assembly as set forth in claim 5 further including a plurality of cutting tools, a turret, a plurality of sockets disposed on said turret each of said sockets being adapted to releasably receive any one of said tools, said turret being rotatable to selectively index each socket to a working position, said conduit including distributing means for directing a flow of coolant from said source to the one socket indexed to the working position and for blocking the flow of coolant to the other sockets.

8. A machine tool assembly as set forth in claim 5 wherein said tool includes a mounting end portion adapted to be received in said socket and a shank upon which shank said cutting edge is disposed, said passage means extending through said tool from said mounting end portion to a location on said shank near said cutting edge.

9. A machine tool assembly for receiving a variety of tools, some of which require coolant, comprising:
a base;
a rotatable turret supported from said base and having a plurality of recesses each of which is adapted to receive a portion of one of the tools;
said turret being rotatable to selectively index each tool receiving recess to a working position;
a coolant fluid inlet formed on said turret;
a source of pressurized coolant fluid connected to said inlet;
coolant distributing means formed in said turret for providing a passage from said coolant inlet through said turret to the tool receiving recess in the working position;
valve means, operable to an open position and a closed position and which is biased to the closed position, formed in the passage provided by the coolant distributing means for controlling coolant flow therethrough; and
actuator means connected with the tools which require coolant for opening said valve means when one of the variety of tools which requires coolant is received in the recess of said turret.

10. A machine as claimed in claim 9 wherein said valve means comprises:
a valve seat formed in the passage through said turret;
a ball disposed in the passage;
a spring biasing said ball into engagement with said valve seat to provide a fluid seal therebetween.

11. A machine as claimed in claim 10 wherein said actuator means comprises:
a tubular member, communicating with the portion of the tool requiring coolant, formed on the tool end and adapted to engage said ball to move it out of engagement with said valve seat when the tool is received in the recess of said turret; and
openings formed in said tubular member to permit coolant flow into said tubular member.

12. An improved machine tool of the type having a turret with a plurality of tool receiving recesses formed therein with each recess being indexible to a working position and wherein coolant is supplied by a passage through the turret to the recess indexed to the working position wherein the improvement comprises:
valve means disposed in each recess operable between an open position and a closed position and being biased to the closed position which prevents coolant flow through the turret passage; and
actuator means connected to tools which require coolant flow for engaging said valve means and forcing it to the open position when disposed in a turret recess allowing coolant flow through the turret passage.

13. An improved machine as claimed in claim 12 wherein the actuator means comprises:
a hollow tubular member having fluid admitting openings formed in the walls thereof and having a free end which engages said valve means when disposed in a turret recess.

14. An improved machine as claimed in claim 13 wherein said valve means comprises:
a ball movably disposed within the turret passage;
a reduced diameter portion of the turret passage being smaller than the diameter of said ball;
a spring biasing said ball to engagement with said reduced diameter portion to close the turret passage.

15. An improved machine as claimed in claim 14 wherein:
said hollow tubular member is circular and of a smaller diameter than said reduced diameter portion and disposed to extend through said reduced diameter portion to engage said ball and move it out of engagement with said reduced diameter portion when a tool requiring coolant is disposed in a recess of the turret.

16. A machine tool assembly comprising a tool having a cutting edge, a housing having at least one socket adapted to releasably receive said tool, a source of pressurized coolant, conduit means for conducting a flow of coolant from said source to the cutting edge of said tool, valve means connected with said housing for controlling coolant flow through said conduit means, said valve means being operable between a closed condition blocking coolant flow in the absence of a tool in the socket and an open condition enabling coolant to flow through said conduit means when a tool is disposed in said socket, and actuator means connected with said tool for operating said valve means from the closed condition to the open condition.

17. A machine tool as set forth in claim 16 wherein said valve means is disposed in said socket.

18. A machine tool as set forth in claim 17 wherein said actuator means includes a tubular member which forms part of said conduit means.

19. A machine tool assembly as set forth in claim 16 wherein said actuator means includes a tubular member having an end portion adapted to actuate said valve means from the closed condition to the open condition upon the insertion of said tool into said socket.

20. A machine tool assembly as set forth in claim 19 wherein said tubular member forms part of said conduit means when said tool is disposed in said socket.

21. A machine tool assembly comprising a base, a turret connected with said base, said turret having a plurality of recesses each of which is adapted to receive a portion of a tool having a cutting edge, a plurality of conduit means on said turret for conducting a flow of coolant, each of said conduit means being associated with one of the tool receiving recesses on said turret and being adapted to direct a flow of coolant toward the cutting edge of a tool disposed in the associated recess, and a plurality of valve means each of which is disposed on said turret in association with one of the tool receiving recesses and is connected in fluid communication with an associated one of said conduit means for controlling the flow of coolant through the associated one of said conduit means, each of said valve means being operable from a closed condition blocking coolant flow through the associated one of said conduit means to an open condition allowing coolant to flow through the associated one of said conduit means in response to insertion of a portion of a tool into the associated one of said recesses.

22. A machine tool assembly as set forth in claim 21 wherein said turret is rotatable, said assembly further including distributing means connected in fluid communication with each of said conduit means for sequentially directing a flow of coolant to each of said conduit means upon rotation of said turret.

* * * * *